(12) United States Patent
Farren et al.

(10) Patent No.: US 8,174,779 B2
(45) Date of Patent: May 8, 2012

(54) DISCRETE DEVICE TESTING

(75) Inventors: Terry Farren, Fremont, CA (US); Heng Gong, San Jose, CA (US); Yong Shen, Saratoga, CA (US); Jing Zhang, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1542 days.

(21) Appl. No.: 11/591,080

(22) Filed: Oct. 31, 2006

(65) Prior Publication Data
US 2008/0104449 A1   May 1, 2008

(51) Int. Cl.
*G11B 27/36* (2006.01)

(52) U.S. Cl. .......................................... 360/31

(58) Field of Classification Search ................. None
See application file for complete search history.

(56) References Cited

U.S. PATENT DOCUMENTS

| | | | |
|---|---|---|---|
| 6,122,131 A | 9/2000 | Jeppson | |
| 6,204,988 B1 | 3/2001 | Codilian et al. | |
| 6,208,477 B1 | 3/2001 | Cloke et al. | |
| 6,636,372 B1 | 10/2003 | Nguyen et al. | |
| 7,138,797 B2 * | 11/2006 | Fox et al. | 324/210 |
| 2004/0060167 A1 | 4/2004 | Wang et al. | |

* cited by examiner

*Primary Examiner* — Daniell L Negron
*Assistant Examiner* — Regina N Holder

(57) ABSTRACT

One embodiment in accordance with the invention is a method that comprises testing a first number of physical devices using a first test sequence that comprises an item. A second number of physical devices are tested using a second test sequence. It is noted that the second test sequence comprises the item of the first test and a second item.

7 Claims, 7 Drawing Sheets

DISCRETE DEVICE TESTING

BACKGROUND

Hard disk drives (HDDs) are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm is utilized to reach out over the disk. The arm carries a head assembly that has a magnetic read/write transducer or head for reading/writing information to or from a location on the disk. The transducer is attached to a slider, such as an air-bearing slider, which is supported adjacent to the data surface of the disk by a cushion of air generated by the rotating disk. The transducer can also be attached to a contact-recording type slider. In either case, the slider is connected to the actuator arm by means of a suspension. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

Another advancement to the hard disk drive is the use of smaller components. For example, by reducing the read/write tolerances of the head portion, the tracks on the disk can be reduced in size by the same margin. Thus, as modern micro recognition technology is applied to the head, the track size on the disk can be further compressed thereby enabling more tracks to be included on the disk, resulting in the disk having an increase data storage capacity.

As part of the production process of hard disk drives, multiple tests are typically run on each Head Gimbal Assembly (HGA) to determine whether it satisfies performance specifications and/or size tolerances. Specifically, the test modules used in current HGA testing consist of utilizing fixed test sequences. Furthermore, to address challenges of reduced head performance margin with increased areal density, the HDD industry has moved from fixed TPI/BPI format and flying-height (FH) to adaptive HDD format by varying TPI/BPI and tunable FH by using Thermal Fly-height Control (TFC). However, current test module with a fixed test sequence has severe limitations to simulate HDD operation, resulting in either poor test efficiency (e.g., poor HDD or HGA yield) or longer test time.

One of the conventional techniques to decrease test time and the expense of testing is to reduce the HGA testing to the essential testing that protects the HDD yield. However, this typically results in the exclusion of other testing that provides information about the testing process, which can be desirable for research and development.

Another issue with fixed test sequence is that dynamic electrical testing (DET) serves various purposes, requiring varying test modules. The current approach is to direct parts with different testers with varying test modules, which increases tester investment and creates additional requirement in parts logistics.

SUMMARY

One embodiment in accordance with the invention is a method that comprises testing a first number of physical devices using a first test sequence that comprises an item. A second number of physical devices are tested using a second test sequence. It is noted that the second test sequence comprises the item of the first test and a second item.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims.

Furthermore, in the following detailed description of various embodiments in accordance with the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Figure 1:
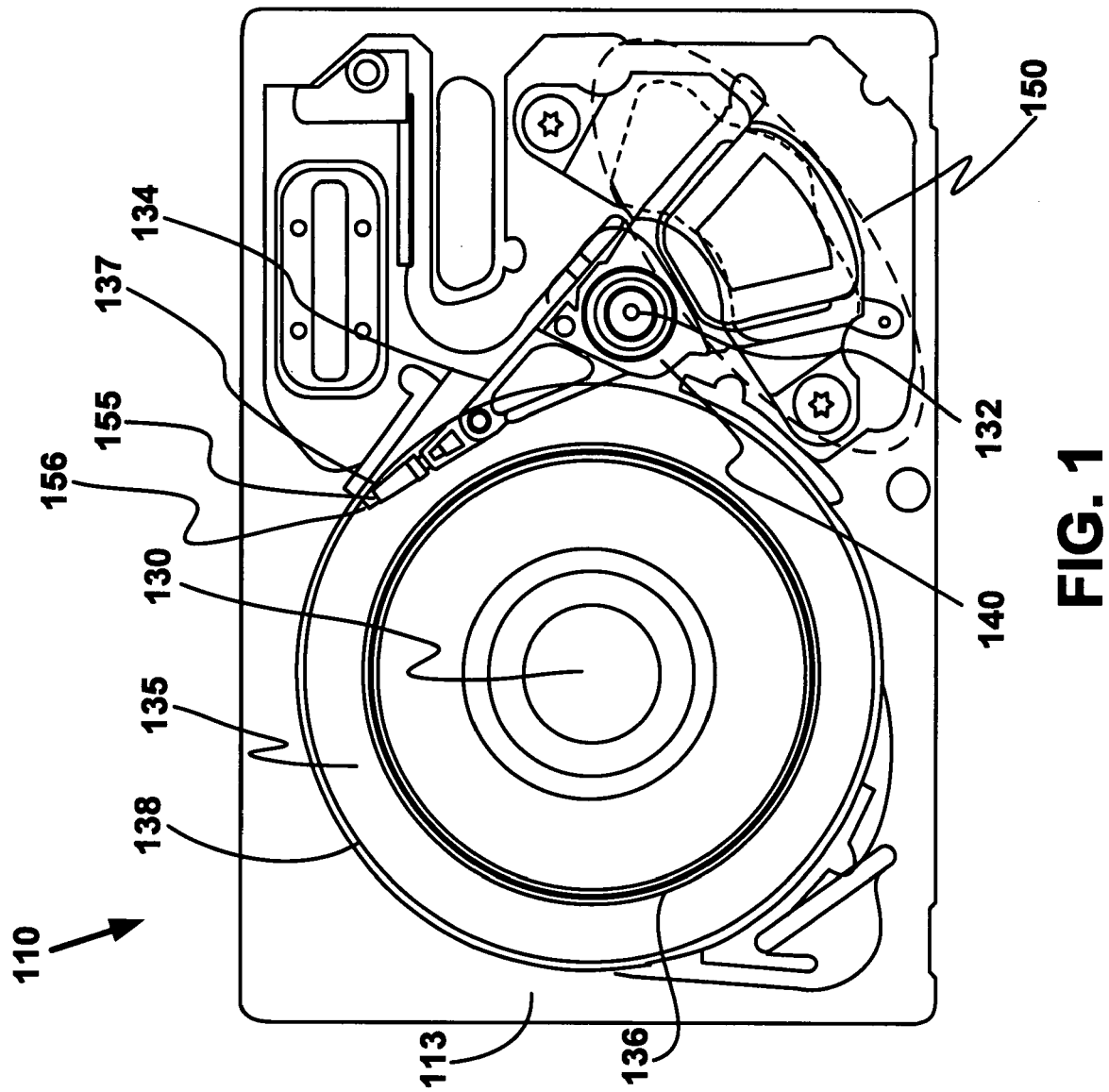
FIG. 1 is a plan view of a hard disk drive (HDD) with cover and top magnet removed in accordance with various embodiments of the invention.

With reference now to FIG. 1, which is a plan view of a hard disk drive (HDD) 110 with cover and top magnet removed in accordance with various embodiments of the invention. It is noted that the HDD 110 can be referred to as a data storage device. FIG. 1 illustrates the relationship of exemplary components and sub-assemblies of HDD 110 and a representation of data tracks 136 recorded on the disk surfaces 135 (one shown). Note that the cover is removed and not shown so that the inside of HDD 110 is visible. The components are assembled into base casting 113, which provides attachment and registration points for components and sub-assemblies.

A plurality of suspension assemblies 137 (one shown) are attached to the actuator arms 134 (one shown) in the form of a comb. A plurality of transducer heads or sliders 155 (one shown) are attached respectively to the suspension assemblies 137. Sliders 155 are located proximate to the disk surfaces 135 for reading and writing data with magnetic heads 156 (one shown). The rotary voice coil motor 150 rotates actuator arms 134 about the actuator shaft 132 in order to move the suspension assemblies 150 to the desired radial position on disks 138. The actuator shaft 132, hub 140, actuator arms 134, and voice coil motor 150 may be referred to collectively as a rotary actuator assembly.

Within FIG. 1, data is recorded onto disk surfaces 135 in a pattern of concentric rings known as data tracks 136. Disk surface 135 is spun at high speed by means of a motor-hub assembly 130. Data tracks 136 are recorded onto spinning disk surfaces 135 by means of magnetic heads 156, which typically reside at the end of sliders 155. FIG. 1 being a plan view shows only one head, slider, and disk surface combination. One skilled in the art understands that what is described for one head-disk combination applies to multiple head-disk combinations, such as disk stacks (not shown). However, for purposes of brevity and clarity, FIG. 1 only shows one head and one disk surface.

Herein, attention is given to performing intelligent testing of any discrete device in accordance with various embodiments of the invention. For example, in various embodiments, the intelligent testing can be compatible with adaptive hard disk drive (HDD) format and tunable slider fly-height (FH).

Figure 2:
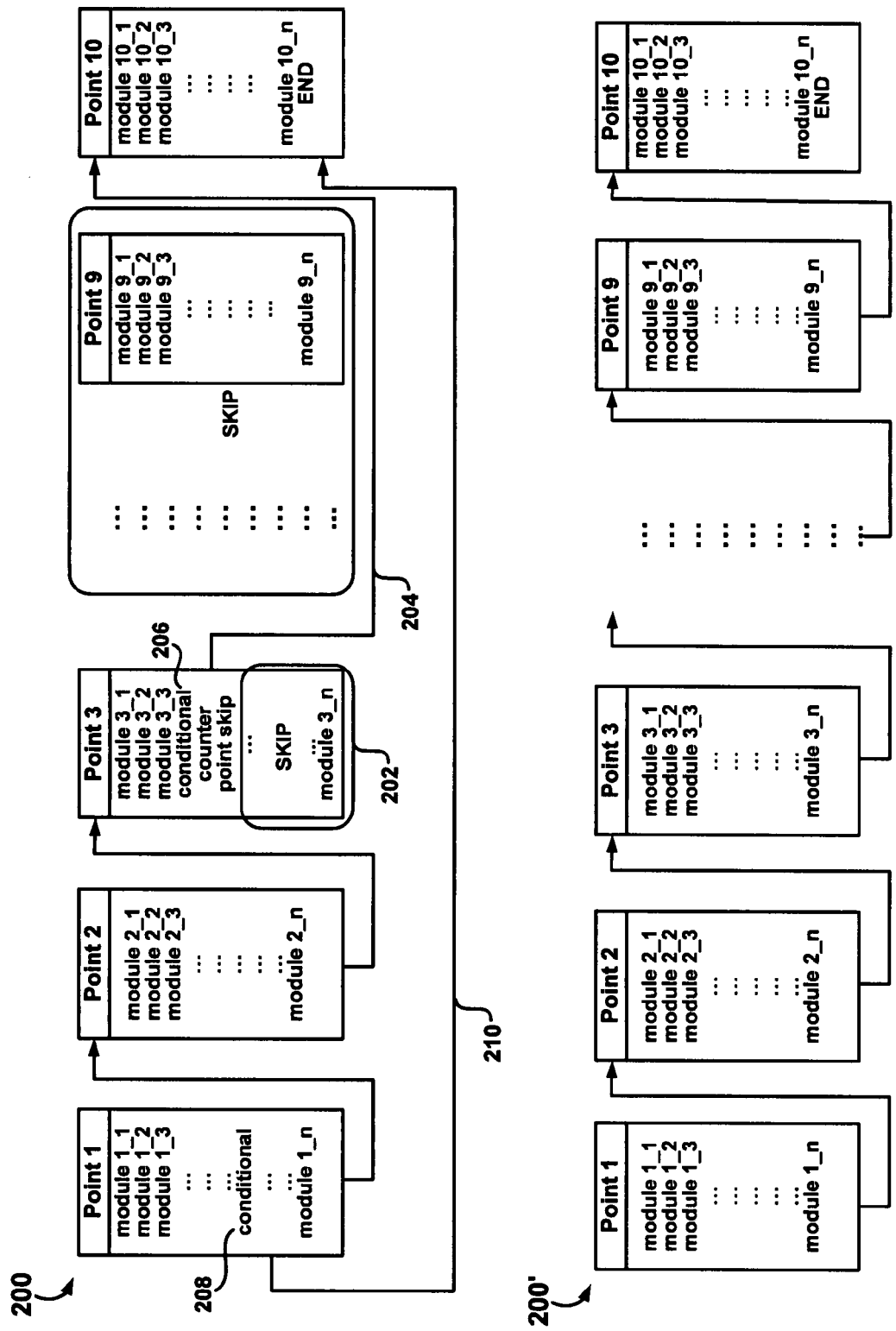
FIG. 2 is a block diagram of an exemplary test execution in accordance with various embodiments of the invention.
Figure 3:
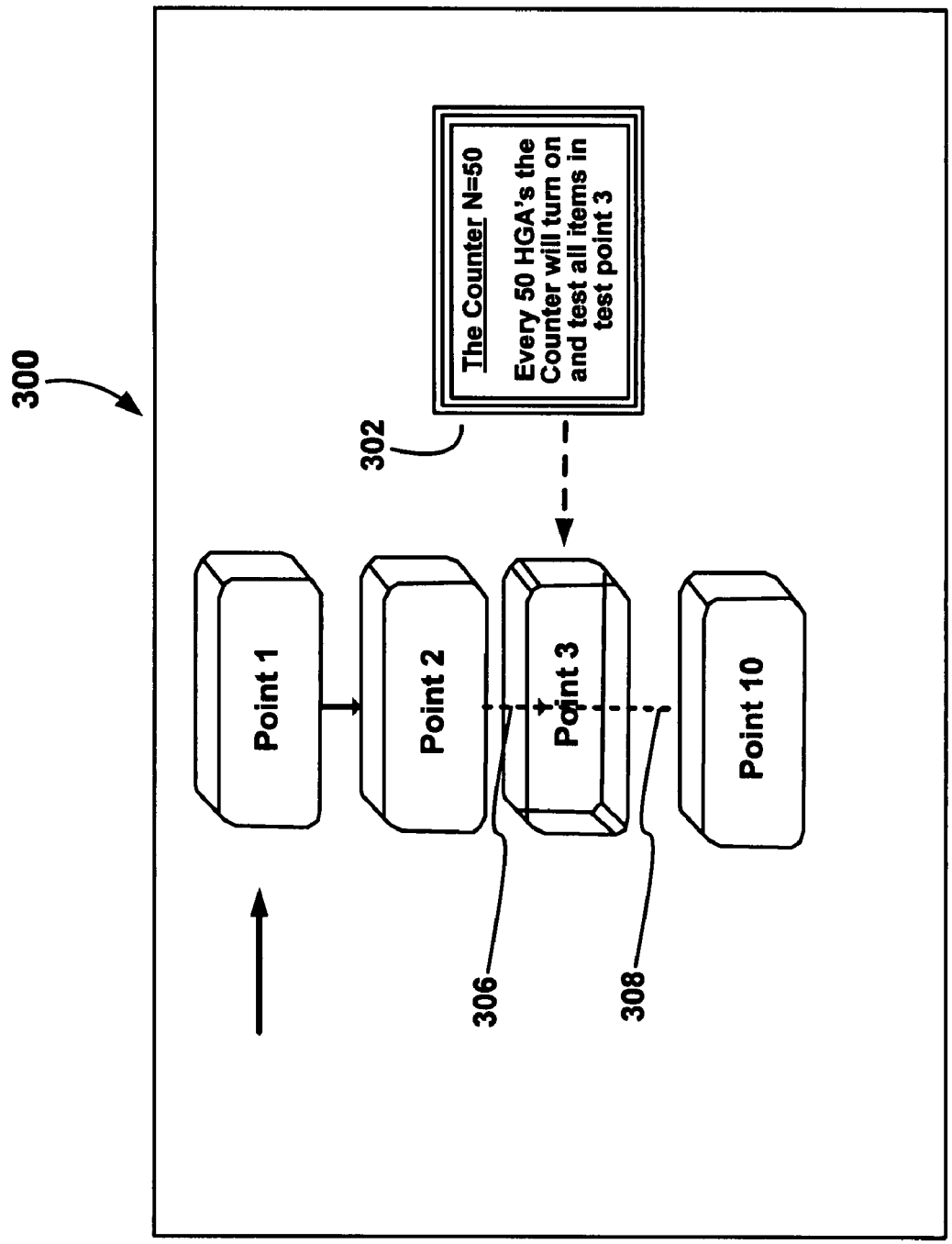
FIG. 3 is a block diagram of another exemplary test execution in accordance with various embodiments of the invention.
Figure 4A:
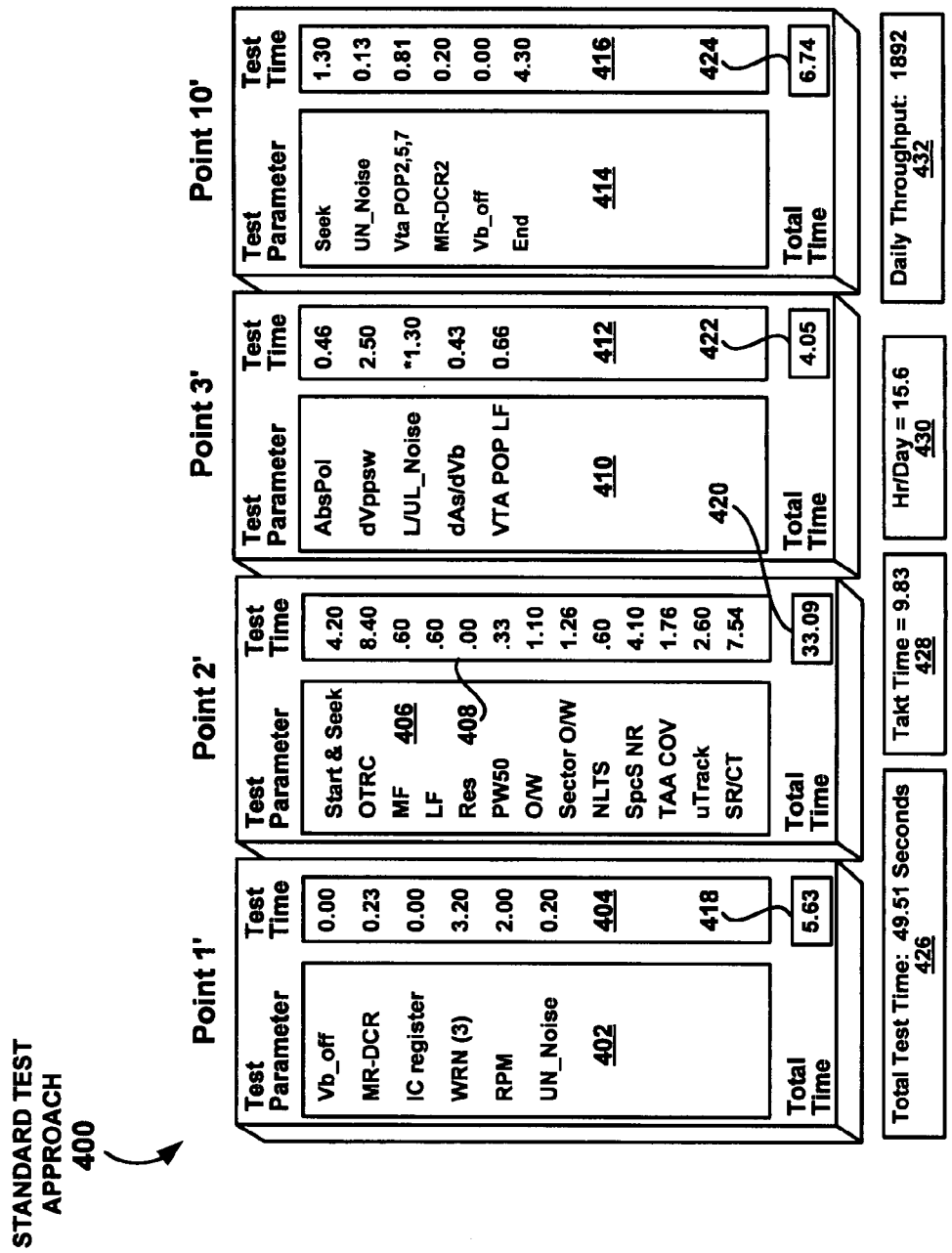
FIG. 4A is a block diagram of a standard test approach along with its actual data.
Figure 4B:
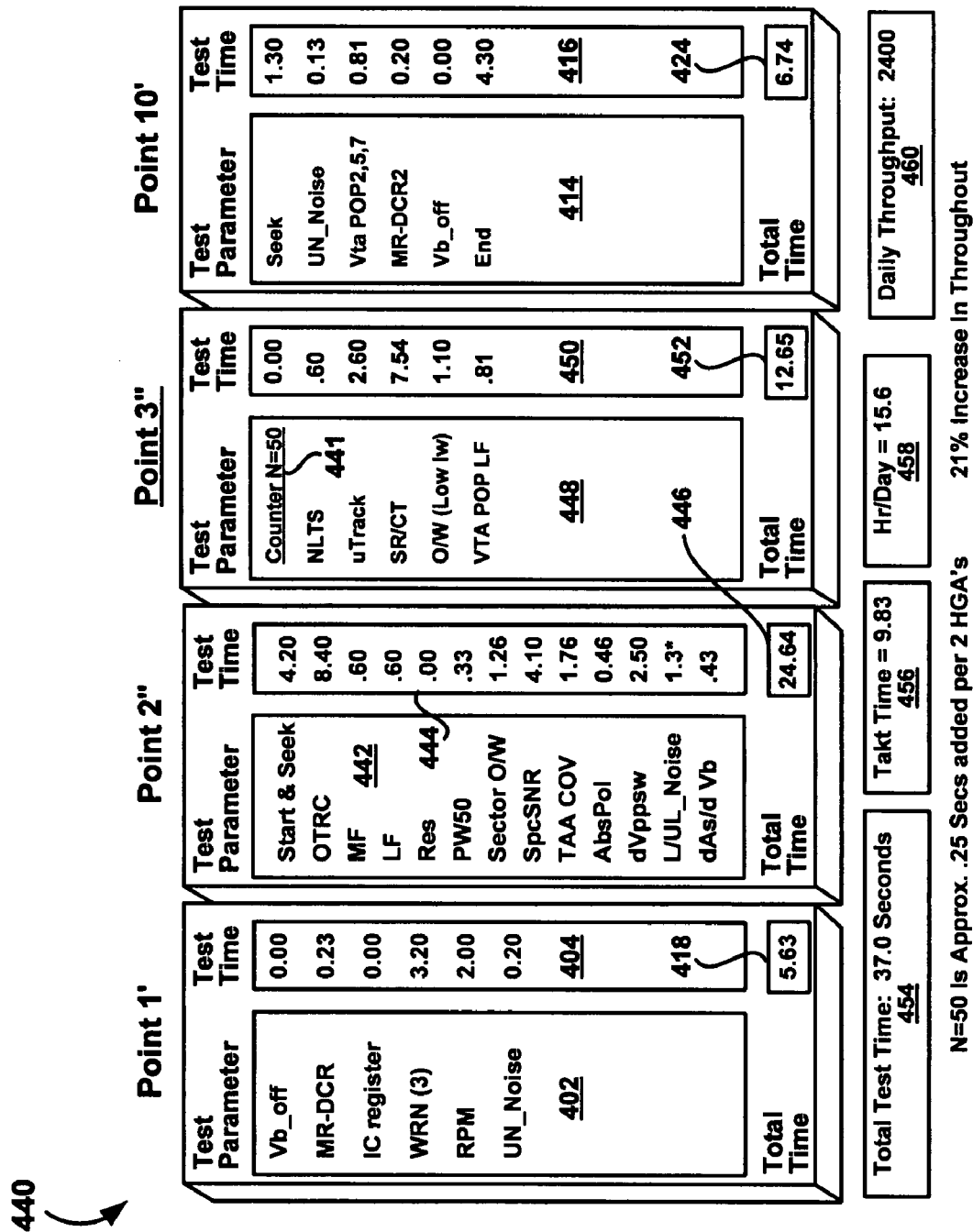
FIG. 4B is a block diagram of an exemplary test execution along with actual data in accordance with various embodiments of the invention.

It is noted that FIGS. 2, 3 and 4B each include exemplary processes of various embodiments of the invention that can be carried out by a processor(s) and electrical components under the control of computing device readable and executable instructions (or code), e.g., software. The computing device readable and executable instructions (or code) may reside, for example, in data storage features such as volatile memory, non-volatile memory, and/or mass data storage that can be usable by a computing device. However, the computing device readable and executable instructions (or code) may reside in any type of computing device readable medium. It is noted that the operations of each of FIGS. 2, 3 and 4B can be performed manually, by software, by firmware, by electronic hardware, or by any combination thereof.

FIG. 2 is a block diagram of an exemplary test execution in accordance with various embodiments of the invention. FIG. 2 includes a test sequence 200 that can be utilized, in one embodiment, to test Head Gimbal Assemblies (HGAs) that can be utilized within hard disk drives (HDDs), e.g., 110. Note that a HGA can include a suspension 137, slider 155 and head 156 along with conductors (not shown) for the head 156. It is pointed out that test sequence 200 can include testing that protects the HDD yield (which may be referred to in the HDD industry as essential or mandatory testing) along with testing that can be informative (e.g., process information). For example, within test sequence 200, the testing that protests the HDD yield can include Test Points 1, 2, 10, and a portion of Test Point 3 (e.g., module 3_1 through module 3_3). Furthermore, the informative testing of test sequence 200 can include any remaining modules 202 of the Test Point 3 along with Test Points 4, 5, 6, 7, 8, and 9.

In one embodiment, a counter for the number of HGAs tested can be established so that test sequences of HGAs can be changed automatically. For example, given that test sequence 200 can include testing that protect the HDD yield along with informative testing, the test sequence 200 can be implemented to include a conditional counter point skip 206 (as shown). As such, a tester device (not shown) controlled by the test sequence 200 can test a HGA using the test modules of Test Point 1, Test Point 2 along with the test modules of Test Point 3 up to the conditional counter point skip 206. The conditional counter 206 can cause the tester to determine the HGA counter value (e.g., the number of HGAs it has tested on this run). If the HGA counter value is less than or equal to a first predefined value N of the conditional counter 206, the tester can skip to Test Point 10 and avoid performing the remaining modules 202 of the Test Point 3 along with any of the modules of Test Points 4, 5, 6, 7, 8, and 9.

However, within FIG. 2, at the first occasion that the HGA counter value is greater than N, the conditional counter 206 can cause the tester to perform the remaining modules 202 of the Test Point 3 along with any of the modules of Test Points 4, 5, 6, 7, 8, 9 and 10, as shown by test sequence 200'. Furthermore, the conditional counter 206 can cause the tester to perform test sequence 200' for a predefined number M of HGAs. Once that has been completed, the conditional counter 206 can then cause the tester to test N number of HGAs using test sequence 200 which includes the skipping (or non-performance) of the remaining modules 202 of Test Point 3 along with any of the modules of Test Points 4, 5, 6, 7, 8, and 9. As such, as long as there are HGAs available to test, the conditional counter 206 can cause the tester to test N number of HGAs in the skip mode of test sequence 200 and then test M number of HGAs in the complete mode of test sequence 200', which can then be repeated over and over again. It is noted that the conditional counter 206 can utilize corresponding function calls (e.g., in sub-VI form) in order to cause the tester to retrieve the HGA counter value and to skip to another point within test sequence 200.

Therefore, it is pointed out that the testing throughput of HGAs is increased since the skip mode (or partial test) of test sequence 200 can be performed more quickly than the complete mode (or full test) of test sequence 200'. However, note that test data is still able to be gathered from those modules that are skipped during test sequence 200 because those modules (which can include informative testing) are occasional performed during test sequence 200', thereby enabling data gathering from them as well. For example, test sequence 200 can be performed by the tester on, for example, 20% of the HGAs it tests. As such, data may be gathered from the remaining modules 202 of Test Point 3 along with any of the modules of Test Points 4, 5, 6, 7, 8, and 9, which can be enough data to be analyzed by a research and development group to inform them how well their design or designs are functioning.

In accordance with various embodiments of the invention, note that the conditional counter 206 can be implemented such that it causes a tester to perform a predefined number X of full execution HGA testing as shown in test sequence 200' and then cause the tester to perform a predefined number Y of skip execution HGA testing as shown in test sequence 200.

Within FIG. 2, in various embodiments, the test sequence 200 can be implemented with a conditional skip 208. The conditional skip 208 can be based on parameters from an initial test sequence and then can enable selection of subsequent test sequences. For example, the tester device controlled by the test sequence 200 can test a HGA using the test modules of Test Point 1 up to the conditional skip 208. As such, the conditional skip 208 can cause the tester to determine whether actual data (and/or values) of one or more parameters associated with the test modules already performed within Test Point 1 meet one or more predefined thresholds or standards.

For example in one embodiment, if the actual data (or value) of a parameter does not meet its corresponding threshold, the conditional skip 208 can cause the tester to skip to the end of test sequence 200 because the remaining tests after the conditional skip 208 may be of little use since the parameter threshold was not met. However, if the actual data (or value) of the parameter does meet its corresponding threshold, the conditional skip 208 can allow the tester to continue to perform the remaining tests of test sequence 200. It is pointed out that if conditional counter 206 is not implemented within test sequence 200, then the tester can perform any remaining modules of Test Point 1 after the conditional skip 208 along with the modules of Test Points 2, 3, 4, 5, 6, 7, 8, 9 and 10, as shown by test sequence 200'. However, if the conditional counter 206 is implemented within test sequence 200 (as shown), it can cause the tester to perform as described above with reference to the conditional counter 206. Note that the conditional skip 208 takes priority over the conditional counter 206 since the conditional skip 208 can cause the tester to skip to the end of test sequence 200, thereby bypassing the conditional counter 206.

It is pointed out that in various embodiments in accordance with the invention, the conditional skip 208 can be enabled within any test point i. Additionally, the conditional skip module 208 can allow the tester to conditionally skip to another test point j (e.g., wherein j>i) without executing the rest of the modules in test point i.

Within FIG. 2, it is noted that test sequence 200 can be implemented with one or more conditional counter point skips 206 and/or conditional skips 208. Understand that a conditional skip 208 can be implemented using the logic associated with an AND logic gate or an OR logic gate. It is pointed out that a conditional skip 208 can be implemented with a "go to" statement, wherein the "go to" statement is computing device programming language syntax. In various embodiments, it is pointed out that if it is desirable to include one or more new tests within test sequence 200, they can be included within one or more of the test points that the conditional counter 206 and/or the conditional skip 208 causes the tester to skip. In this manner, the test time will not be significantly increased by the additional of the one or more new tests because the skipped portion of test sequence 200 may not be performed that often. Furthermore, in order to more closely maintain test time execution, one or more test modules within the skipped portion of test sequence 200 can be removed in order to compensate for the addition of the one or more new test added to the skipped portion of the test sequence 200.

In various embodiments, the test sequence 200 can be utilized to test HGAs and any other components for HDDs, but is not limited to such. For example, the test sequence 200 can be applied to many different technology areas with regard to testing of discrete devices. It is noted that the test sequence 200 can involve testing actual physical devices, which can be part of the production process of the devices.

FIG. 3 is a block diagram of an exemplary test execution 300 in accordance with various embodiments of the invention. It is pointed out that test execution 300 can include a conditional counter skip (e.g., 206) that is implemented at the end of Test Point 2 or at the beginning of Test Point 3. As such, if the conditional counter skip is implemented at the end of Test Point 2 and the counter condition is not met, the conditional counter can cause a tester to proceed to Test Point 10 and completely skip Test Point 3, as indicated by arrow 308. However, if the conditional counter skip is implemented at the beginning of Test Point 3, the tester can proceed to Test Point 3 as indicated by arrow 306. If the counter condition is not met, the conditional counter can cause the tester to proceed to Test Point 10, as indicated by arrow 308.

In an embodiment in accordance with the invention, text box 302 indicates that the counter value of N is equal to 50 tested HGAs. As such, after the tester tests 50 HGAs using test items or modules of Test Points 1, 2 and 10, the conditional counter can turned on (or cause) the tester to perform (or test) all items in Test Point 3. After completion of Test Point 10, if there are any other HGAs to test, the tester under the direction of the conditional counter can proceed to test another 50 HGAs before performing a full execution of Test Points 1, 2, 3, and 10.

FIGS. 4A and 4B include actual test execution data in order to provide a comparison between a standard test approach 400 and a testing method 440 in accordance with an embodiment of the invention. Specifically, FIGS. 4A and 4B illustrate the difference in performance when executing a test sequence that includes similar test parameters. Note that the improved testing method 440 in accordance with the invention was been implemented in a manner similar to test execution 300 of FIG. 3, described herein. For example, a conditional counter 441 within the improved testing method 440 caused a tester to test 50 (N=50) HGAs using Test Points 1', 2'' and 10' and then the conditional counter 441 caused the tester to test 1 (M=1) HGA using Test Points 1', 2''', 3'' and 10'. It is understood that this sequence would then be repeated.

FIG. 4A is a block diagram of an exemplary standard test approach 400 along with its resulting data. The standard test approach 400 includes Test Points 1', 2', 3' and 10'. Test Point 1' includes test parameters 402 along with each of their corresponding test times 404 and the total test time 418 associated with Test Point 1'. Test Point 2' includes test parameters 406 along with each of their corresponding test times 408 and the total test time 420 associated with Test Point 2'. Test Point 3' includes test parameters 410 along with each of their corresponding test times 412 and the total test time 422 associated with Test Point 3'. Test Point 10' includes test parameters 414 along with each of their corresponding test times 416 and the total test time 424 associated with Test Point 10'. The total test time 426 of the standard test approach 400 for a HGA is 49.51 seconds, the Takt time 428 (load and unload time) is equal to 9.83 seconds, the hours per day (Hr/Day) 430 is equal to 15.6, and the daily throughput 432 is equal to 1892 HGAs.

FIG. 4B is a block diagram of an exemplary testing method 440 in accordance with an embodiment of the invention along with its resulting data. The improved testing method 440 includes Test Points 1', 2'', 3'' and 10'. Test Point 1' includes test parameters 402 along with each of their corresponding test times 404 and the total test time 418 associated with Test Point 1'. Test Point 2'' includes test parameters 442 along with each of their corresponding test times 444 and the total test time 446 associated with Test Point 2''. Test Point 3'' includes test parameters 448 along with each of their corresponding test times 450 and the total test time 452 associated with Test Point 3''. Test Point 10' includes test parameters 414 along with each of their corresponding test times 416 and the total test time 424 associated with Test Point 10'. The total test time 454 of the improved testing method 440 for a HGA is 37 seconds, the Takt time 456 is equal to 9.83 seconds, the hours per day 458 is equal to 15.6, and the daily throughput 460 is equal to 2400 HGAs.

Given that the Takt times 428 and 456 and the hours per day 430 and 458 are the same for the standard test approach 400 and the improved testing method 440, it is pointed out that by utilizing the improved testing method 440 there was a 21% increase in the daily throughput of tested HGAs over the standard test approach 400.

Within FIGS. 4A and 4B, it is noted that the test parameters 406 of Test Point 2' of the standard test approach 400 are not the same as the test parameters 442 of Test Point 2" of the improved testing method 440. Furthermore, the test parameters 410 of Test Point 3' of the standard test approach 400 are not the same as the test parameters 448 of Test Point 3" of the improved testing method 440. However, the combination of test parameters 404 and 410 of the standard test approach 400 are similar to the combination of test parameters 442 and 448 of the improved testing method 440, when the conditional counter 441 is excluded.

Within FIG. 4B, it is noted that in one embodiment, the implementation of the conditional counter 441 within Test Point 3" of the improved testing method 440 added approximately 0.25 seconds per 2 HGAs tested. However, by utilizing the conditional counter 441, the improved testing method 440 results in 37 seconds of total testing time 454 which is more than 12.5 seconds faster than the 49.51 seconds of total testing time 426 of the standard test approach 400. It is pointed out that the improved testing method 440 can be modified in accordance with various embodiments of the invention. For example, the value of N can be greater than or less than the 50 utilized for the improved testing method 440. Furthermore, the value of M can be greater than the 1 utilized for the improved testing method 440.

Figure 5:
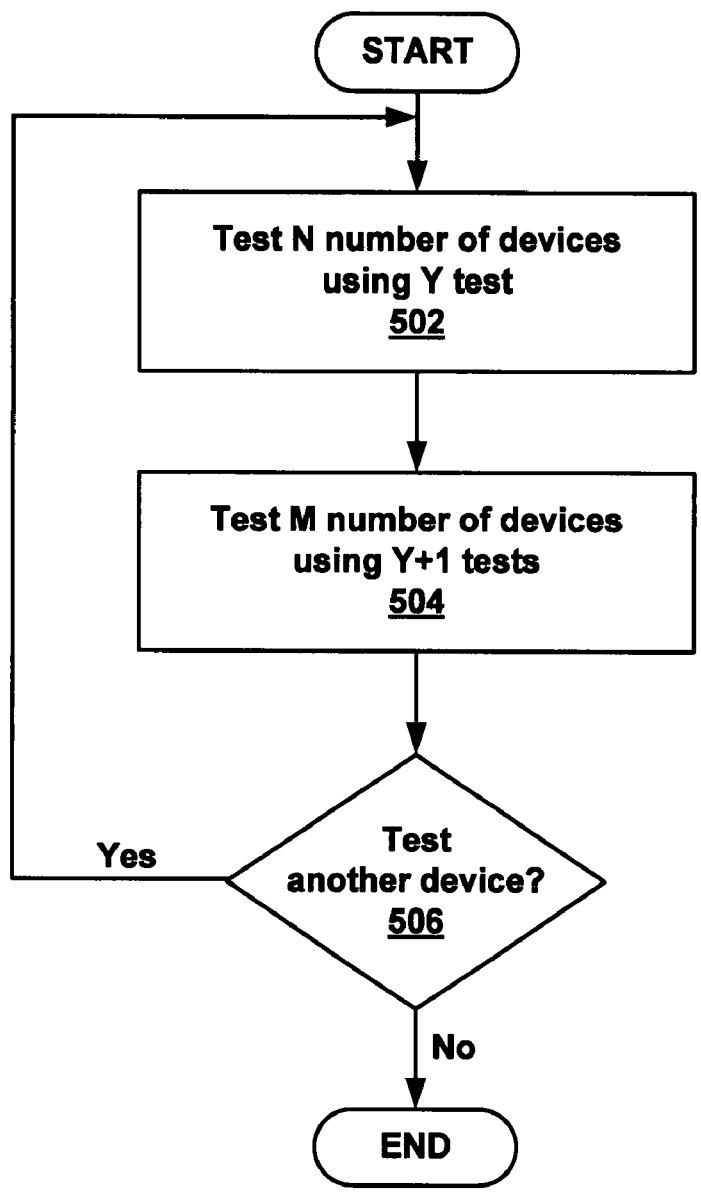
FIG. 5 is a flow diagram in accordance with various embodiments of the invention.

FIG. 5 is a flow diagram of an exemplary method 500 in accordance with various embodiments of the invention for testing discrete devices. Method 500 includes exemplary processes of various embodiments of the invention that can be carried out by a processor(s) and electrical components under the control of computing device readable and executable instructions (or code), e.g., software. The computing device readable and executable instructions (or code) may reside, for example, in data storage features such as volatile memory, non-volatile memory, and/or mass data storage that can be usable by a computing device. However, the computing device readable and executable instructions (or code) may reside in any type of computing device readable medium. Although specific operations are disclosed in method 500, such operations are exemplary. Method 500 may not include all of the operations illustrated by FIG. 5. Also, method 500 may include various other operations and/or variations of the operations shown by FIG. 5. Likewise, the sequence of the operations of method 500 can be modified. It is noted that the operations of method 500 can be performed manually, by software, by firmware, by electronic hardware, or by any combination thereof.

Specifically, method 500 can include testing N number of devices using a Y test. It is noted that the variable N can be equal to one or more devices. Additionally, the Y test can include one or more tests. Method 500 can also include testing M number of devices using Y+1 tests. It is pointed out that the variable M can be equal to one or more devices and may also be greater than, less than, or equal to the value of the variable N. Moreover, the Y+1 tests can include the one or more tests of the Y test plus one or more additional tests. A determination can be made as to whether another device is to be tested. If so, method 500 can proceed to repeat the testing of N number of devices using the Y test. However, if another device is not to be tested, method 500 can be exited. In this manner, method 500 can provide discrete device testing in accordance with various embodiments of the invention.

At operation 502 of FIG. 5, N number of devices can be tested using a Y test (e.g., Test Points 1, 2 and 10). Note that the variable N at operation 502 can be equal to one or more devices. Furthermore, the Y test at operation 502 can include one or more tests. It is appreciated that operation 502 can be implemented in a wide variety of ways. For example in various embodiments, N number of devices can be tested at operation 502 using a Y test in any manner similar to that described herein, but is not limited to such.

At operation 504, M number of devices can be tested using Y+1 tests (e.g., Test Points 1, 2, 3 and 10). Understand that the variable M can be equal to one or more devices and may also be greater than, less than, or equal to the value of the variable N. Moreover, the Y+1 tests can include, but are not limited to, the one or more tests of the Y test plus one or more additional tests. It is noted that operation 504 can be implemented in a wide variety of ways. For example in various embodiments, M number of devices can be tested at operation 504 using Y+1 tests in any manner similar to that described herein, but is not limited to such.

At operation 506 of FIG. 5, a determination can be made as to whether another device is to be tested. If so, method 500 can proceed to operation 502. However, if another device is not to be tested, method 500 can be exited. Appreciate that operation 506 can be implemented in a wide variety of ways. For example in various embodiments, the determination at operation 506 as to whether another device is to be tested can be implemented in any manner similar to that described herein, but is not limited to such. In this fashion, method 500 can provide discrete device testing in accordance with various embodiments of the invention.

Figure 6:
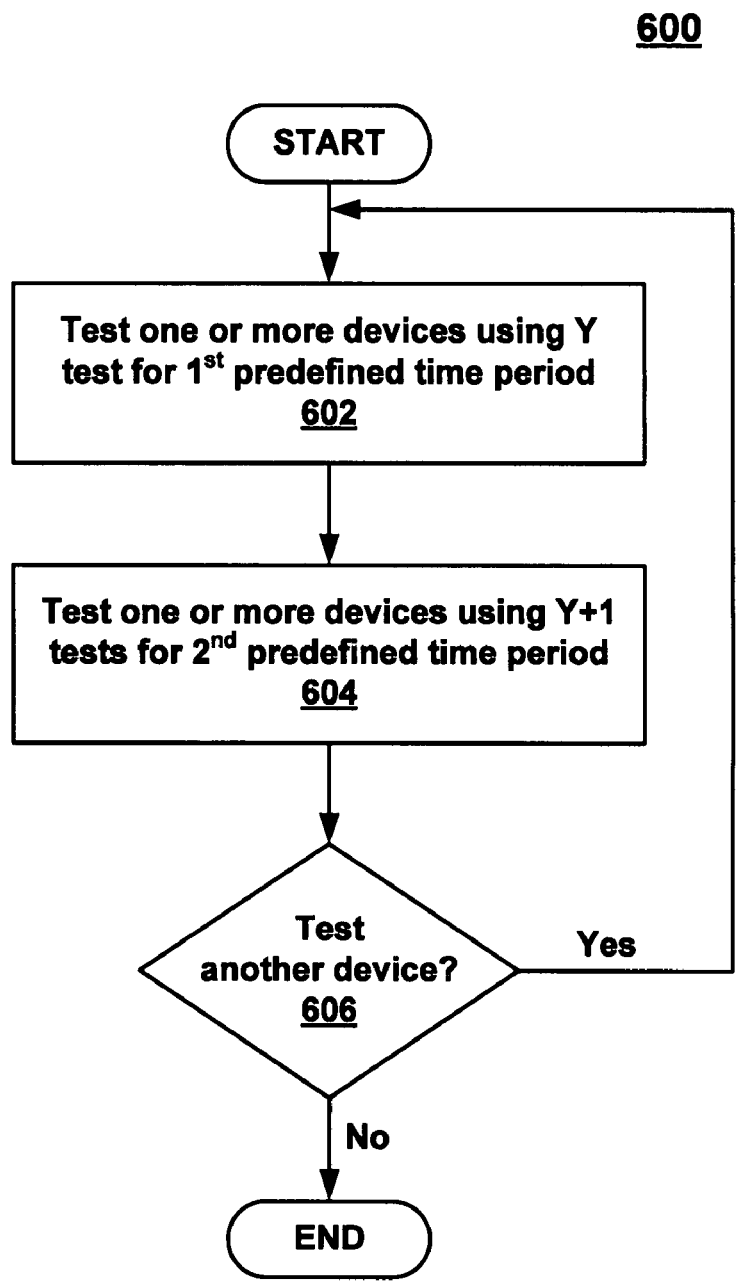
FIG. 6 is another flow diagram in accordance with various embodiments of the invention.

FIG. 6 is a flow diagram of an exemplary method 600 in accordance with various embodiments of the invention for testing discrete devices. Method 600 includes exemplary processes of various embodiments of the invention that can be carried out by a processor(s) and electrical components under the control of computing device readable and executable instructions (or code), e.g., software. The computing device readable and executable instructions (or code) may reside, for example, in data storage features such as volatile memory, non-volatile memory, and/or mass data storage that can be usable by a computing device. However, the computing device readable and executable instructions (or code) may reside in any type of computing device readable medium. Although specific operations are disclosed in method 600, such operations are exemplary. Method 600 may not include all of the operations illustrated by FIG. 6. Also, method 600 may include various other operations and/or variations of the operations shown by FIG. 6. Likewise, the sequence of the operations of method 600 can be modified. It is noted that the operations of method 600 can be performed manually, by software, by firmware, by electronic hardware, or by any combination thereof.

Specifically, method 600 can include testing one or more devices using a Y test for a first predefined time period. It is noted that the Y test can include one or more tests. Additionally, the first predefined time period can include any time period. Method 600 can also include testing one or more devices using Y+1 tests for a second predefined time period. It is pointed out that the Y+1 tests can include the one or more tests of the Y test plus one or more additional tests. Understand that the second predefined time period can include any time period and may be greater than, less than, or equal to the first predefined time period. A determination can be made as to whether another device is to be tested. If so, method 600 can proceed to repeat the testing of one or more devices using the Y test. However, if another device is not to be tested, method 600 can be exited. In this fashion, method 600 can provide discrete device testing in accordance with various embodiments of the invention.

At operation 602 of FIG. 6, one or more devices can be tested using a Y test (e.g., Test Points 1, 2 and 10) for a first predefined time period. Note that the Y test can include one or more tests. Furthermore, the first predefined time period can include any amount of time or any time period. It is understood that operation 602 can be implemented in a wide variety of ways. For example in various embodiments, one or more devices can be tested for the first predefined time period at operation 602 using a Y test in any manner similar to that described herein, but is not limited to such.

At operation 604, one or more devices can be tested using Y+1 tests (e.g., Test Points 1, 2, 3 and 10) for a second predefined time period. Appreciate that the Y+1 tests can include, but are not limited to, the one or more tests of the Y test plus one or more additional tests. It is noted that the second predefined time period can include any amount of time or time period and may be greater than, less than, or equal to the first predefined time period. It is noted that operation 604 can be implemented in a wide variety of ways. For example in various embodiments, one or more devices can be tested at operation 604 using Y+1 tests for the second predefined time period in any manner similar to that described herein, but is not limited to such.

At operation 606 of FIG. 6, a determination can be made as to whether another device is to be tested. If so, method 600 can proceed to operation 602. However, if another device is not to be tested, method 600 can be exited. It is understood that operation 606 can be implemented in a wide variety of ways. For example in various embodiments, the determination at operation 606 as to whether another device is to be tested can be implemented in any manner similar to that described herein, but is not limited to such. In this manner, method 600 can provide discrete device testing in accordance with various embodiments of the invention.

The foregoing descriptions of various specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A method comprising:
    testing one or more physical devices using a first test sequence that comprises an item for a first predefined time period; and
    testing one or more physical devices using a second test sequence for a second predefined time period, wherein said second test sequence comprises said item of said first test and a second item, wherein said first predefined time period is greater than said second predefined time period.

2. The method of claim 1, wherein said testing said one or more physical devices using said first test sequence comprises skipping said second item of said second test sequence.

3. The method of claim 1, further comprising:
    repeating said testing said one or more physical devices using said first test sequence and said testing said one or more physical devices using said second test sequence.

4. The method of claim 1, wherein said one or more physical devices using said first test sequence comprises a head gimbal assembly for a data storage device.

5. The method of claim 4, wherein said one or more physical devices using said second test sequence comprises a second head gimbal assembly.

6. A method comprising:
    testing a first number of physical devices using a first test sequence that comprises an item; and
    testing a second number of physical devices using a second test sequence, wherein said second test sequence comprises said item of said first test and a second item wherein said first number of physical devices is less than said second number of physical devices.

7. A method comprising:
    testing one or more physical devices using a first test sequence that comprises an item for a first predefined time period; and
    testing one or more physical devices using a second test sequence for a second predefined time period, wherein said second test sequence comprises said item of said first test and a second item, wherein said first predefined time period is equal to said second predefined time period.

* * * * *